United States Patent
Park et al.

(10) Patent No.: US 8,541,975 B2
(45) Date of Patent: Sep. 24, 2013

(54) SYSTEM AND METHOD FOR EFFICIENT WIRELESS CHARGING OF A MOBILE TERMINAL

(75) Inventors: Sung-Kweon Park, Gyeonggi-do (KR);
Young-Min Lee, Gyeonggi-do (KR);
Ki-Hyun Kim, Gyeonggi-do (KR);
Hong-Kweun Kim, Gyeonggi-do (KR);
Se-Ho Park, Gyeonggi-do (KR);
Woo-Ram Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 350 days.

(21) Appl. No.: 12/884,065

(22) Filed: Sep. 16, 2010

(65) Prior Publication Data

US 2011/0062914 A1    Mar. 17, 2011

(30) Foreign Application Priority Data

Sep. 16, 2009    (KR) .................. 10-2009-0087541

(51) Int. Cl.
*H02J 7/00*    (2006.01)
(52) U.S. Cl.
USPC ........... 320/108; 320/104; 320/107; 320/114
(58) Field of Classification Search
CPC ....................................... H01F 38/14
USPC ............................................. 320/108
See application file for complete search history.

(56) References Cited

U.S. PATENT DOCUMENTS

| 7,042,196 | B2 * | 5/2006 | Ka-Lai et al. ................. | 320/108 |
| 7,271,569 | B2 | 9/2007 | Oglesbee | |
| 7,477,039 | B2 | 1/2009 | Rodarte | |
| 8,169,185 | B2 * | 5/2012 | Partovi et al. ................. | 320/108 |
| 8,183,827 | B2 * | 5/2012 | Lyon ............................. | 320/108 |
| 2007/0285049 | A1 * | 12/2007 | Krieger et al. ................ | 320/105 |
| 2008/0078962 | A1 | 4/2008 | Hoxha | |
| 2008/0116876 | A1 | 5/2008 | White et al. | |

* cited by examiner

*Primary Examiner* — Edward Tso
*Assistant Examiner* — Ahmed Omar
(74) *Attorney, Agent, or Firm* — The Farrell Law Firm, P.C.

(57) ABSTRACT

Disclosed is a method and apparatus for efficient wireless charging of a mobile terminal. The method includes detecting the mobile terminal by a charging apparatus, receiving a unique identifier of the mobile terminal from the mobile terminal and determining if the mobile terminal is a rechargeable device, when the mobile terminal is a rechargeable device, applying a direct voltage to a first coil of the charging apparatus and arranging the charging apparatus and the mobile terminal, and terminating an application of the direct voltage and then applying an alternating voltage, to supply charging power required for the mobile terminal.

17 Claims, 5 Drawing Sheets

SYSTEM AND METHOD FOR EFFICIENT WIRELESS CHARGING OF A MOBILE TERMINAL

PRIORITY

This application claims priority under 35 U.S.C. §119(a) to a Korean Patent Application entitled "System and Method for Efficient Wireless Charging of A Mobile Terminal" filed in the Korean Industrial Property Office on Sep. 16, 2009 and assigned Serial No. 10-2009-0087541, the contents of which are incorporated herein by reference.

BACKGROUND OF THE INVENTION

1. Field of the Invention

The present invention generally relates to a wireless charging of a mobile terminal, and more particularly to a system and a method for wireless charging using electromagnetic induction.

2. Description of the Related Art

A mobile terminal, such as a cellular phone or PDA (Personal Digital Assistant), is driven by a rechargeable battery. In order to charge the battery, electric energy is supplied to the battery of the mobile terminal by using a separate charging apparatus. Typically, the charging apparatus and the battery have separate contact terminals on their exteriors, respectively, so that by contacting the contact terminals with each other, the charging apparatus is electrically connected with the battery.

However, since the contact terminal protrudes from the external side of the charging apparatus and the battery, the contact-type charging method creates a problem in that the contact terminal can be easily contaminated by foreign materials, thereby failing to appropriately charge the battery. Further, when the contact terminal is exposed to a moist or humid environment, it is nearly impossible to charge the battery.

In order to solve these problems, wireless charging technology or contactless charging technology has recently developed, and has been applied to many electronic devices. This technology is representatively applied to electronic devices, such as an electric toothbrush and an electric shaver, and has been recently adapted to a battery of a hybrid car and a mobile terminal.

The wireless charging technology is classified into three schemes, i.e. an inductive coupling scheme, an RF (Radio Frequency) wave radiation scheme, and an evanescent wave resonance scheme. Among them, the inductive coupling scheme has been most efficiently and widely used until now. The basic principle of the inductive coupling scheme is the same as that of a transformer. In the wireless charging system, a coil of the transformer is divided into a first coil and a second coil, and the first coil is mounted in the charging apparatus and the second coil is mounted in the mobile terminal.

The coil for use can be manufactured in various shapes, and in particular, a planar spiral coil is widely used in small devices, such as a mobile terminal. In this case, the power efficiency of the charging can be represented as a ratio of power applied to the first coil to power induced in the second coil. In order to increase the charging efficiency, the arrangement of the first coil and the second coil is very important. When an arrangement offset is generated, induced electromotive force is not sufficiently induced to the second coil, so that the charging efficiency deteriorates in comparison with a wired charging system. That is, when the coils are not appropriately arranged, the charging efficiency remarkably deteriorates, and thus the time for charging also increases.

A method for arranging the first coil and the second coil includes an arrangement method using a permanent magnet, an arrangement method using mechanical assembling of the charging apparatus and the mobile terminal, and an arrangement method using a change of an arrangement pattern of the first coil, among others. However, those arrangement methods have the following problems.

The arrangement method using the permanent magnet has a problem in that a static magnetic field created by the permanent magnet influences on a time-varying magnetic field, so as to deteriorate the assembling efficiency, as well as a design problem due to the mechanical size and weight of the permanent magnet. Further, when the permanent magnet is mounted on the mobile terminal or the charging apparatus, various metal things can attach to the mobile terminal or the charging apparatus, thereby incurring the inconvenience to the user.

In the arrangement method using mechanical assembling of the charging apparatus and the mobile terminal, the charging apparatus and the mobile terminal should be compatibly designed on a one-to-one basis, so that one charging apparatus cannot be used for a different mobile terminal, thereby limiting the compatibility with other mobile terminals.

In the arrangement method using the changing of the arrangement pattern of the first coil, it is possible to guarantee a relatively high charging efficiency, regardless of the location and direction of the second coil. However, energy waste is excessive in comparison with a case where a single coil is used.

SUMMARY OF THE INVENTION

Accordingly, the present invention has been made to solve the above-stated problems occurring in the prior art, and the present invention provides a method for efficiently transferring induced electromotive force to a second coil by applying direct voltage, so as to appropriately arrange a first coil and a second coil.

In accordance with an aspect of the present invention, there is provided a charging apparatus for efficient wireless charging of a mobile terminal, including at least one sensor for detecting the mobile terminal; a Radio Frequency (RF) receiver for receiving a unique identifier of the mobile terminal from the mobile terminal and determining if the mobile terminal is a rechargeable device; a power supply unit for receiving an alternating voltage from an external power source and transmitting the received alternating voltage; at least one modulator for directly applying the alternating voltage received from the power supply unit to a first coil, or converting the alternating voltage received from the power supply unit to a direct voltage and applying the converted direct voltage to the first coil; and a controller for controlling whether to convert the alternating voltage received from said at least one modulator.

In accordance with another aspect of the present invention, there is provided a method for efficient wireless charging of a mobile terminal, including: detecting the mobile terminal by a charging apparatus; receiving a unique identifier of the mobile terminal from the mobile terminal and determining if the mobile terminal is a rechargeable device; when the mobile terminal is a rechargeable device, applying a direct voltage to a first coil of the charging apparatus and arranging the charging apparatus and the mobile terminal; and terminating an application of the direct voltage and then applying an alternating voltage, to supply charging power required for the mobile terminal.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
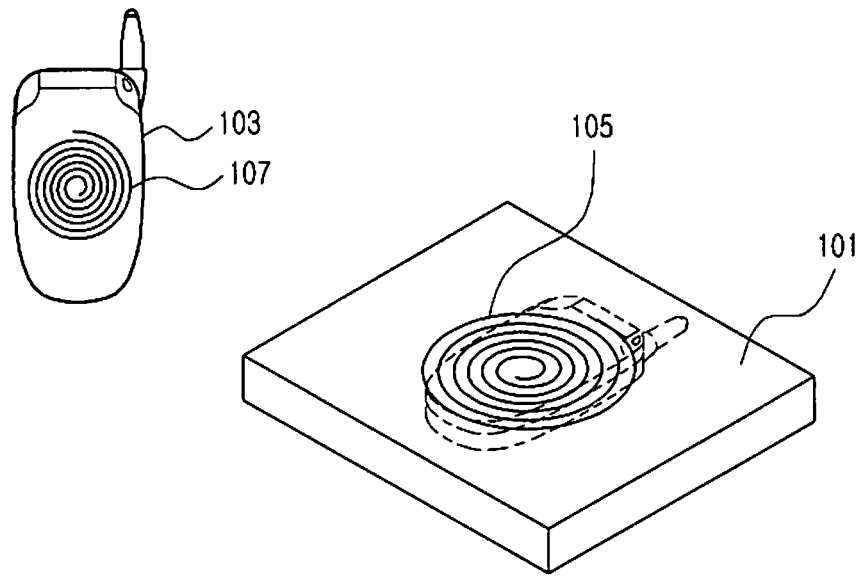
FIG. 1 is a perspective view illustrating a wireless charging system using electromagnetic induction according to the present invention.

Hereinafter, preferred embodiments of the present invention will be described with reference to the accompanying drawings. In the following description, the same elements will be designated by the same reference numerals although they are shown in different drawings. Further, various specific definitions found in the following description are provided only to help general understanding of the present invention, and it will be understood by those skilled in the art that various changes in form and details may be made therein without departing from the spirit and scope of the invention.

FIG. 1 is a perspective view illustrating a wireless charging system using electromagnetic induction according to the present invention. The wireless charging system includes a charging apparatus 101 and a mobile terminal 103 including a battery.

Referring to FIG. 1, the battery mounted on the mobile terminal 103 is a rechargeable battery, such as a lithium-ion battery, a lithium-polymer battery, or the like. The charging apparatus 101 receives electric energy from an external power source (not shown) and generates charging power to be provided to the battery of the mobile terminal 103. The charging apparatus 101 is formed in a planar shape for easy contact with the mobile terminal 103 according to FIG. 1, but it can take various shapes. The charging apparatus 101 includes a first coil 105, and the mobile terminal 103 includes a second coil 107. Although not shown in FIG. 1, the charging apparatus 101 includes a built-in charging power supply circuit for driving the first coil 105 and generating a magnetic field. The mobile terminal 103 has a built-in charging circuit for charging the battery using induced electromagnetic force induced to the second coil 107.

When the mobile terminal 103 to be charged is placed on the charging apparatus including a sending end, the charging apparatus 101 recognizes a location of the placed mobile terminal 103 by at least one sensor installed in the charging apparatus 101. Here, the sensor can be a pressure-sensitive sensor sensing weight or pressure, or a current sensor generating a current in a predetermined time interval and sensing an object, etc. The sensor for recognizing the location is installed in the vicinity of the first coil, and the location recognition is determined by an area occupied by the first coil, not a particular point.

Then, the first coil and the second coil are magnetically coupled by the inductive coupling. Therefore, the magnetic field generated by the first coil induces the induced current into the second coil.

Figure 2:
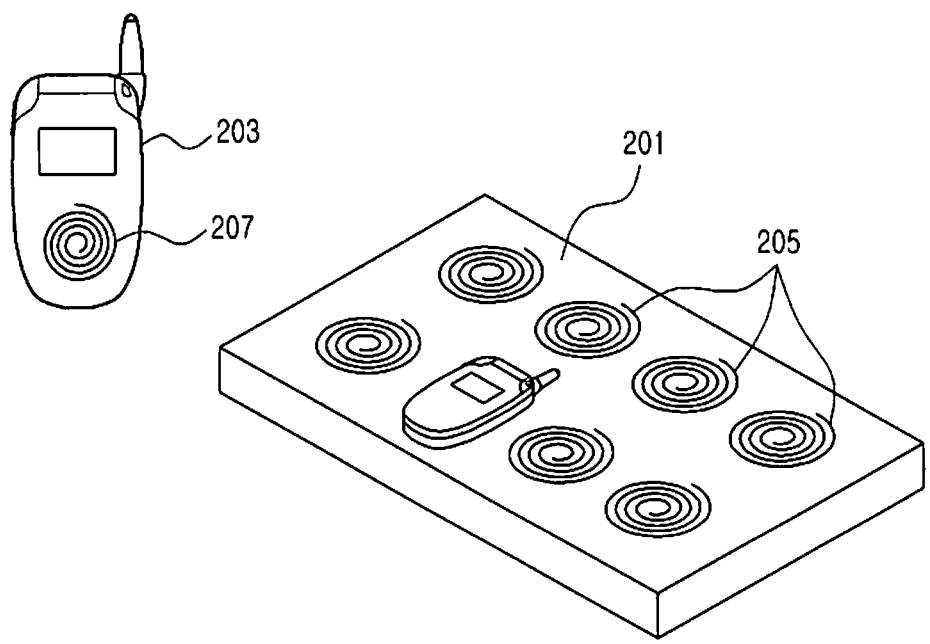
FIG. 2 is a perspective view illustrating a multi-wireless charging system using electromagnetic induction according to the present invention.

FIG. 2 is a perspective view illustrating a multi-wireless charging system using electromagnetic induction according to the present invention. According to FIG. 1, the single first coil is mounted in the charging apparatus 101. However, according to FIG. 2, multiple first coils 205 are mounted in the charging apparatus 201.

Referring to FIG. 2, the charging apparatus 201 includes a plurality of first coils 205, and the mobile terminal 203 including the second coil 207 receives charging power by any one among eight first coils 205. When the charging apparatus 201 includes the multiple first coils 205, there are advantages in that it is relatively easy to arrange the first coils 205 with respect to the second coil 207, and a plurality of rechargeable devices can be charged on the single charging apparatus 201.

The first coil and the second coil illustrated in FIGS. 1 and 2 include magnetic substances at their centers. A method for efficiently arranging the first coil and the second coil through changing a type of the voltage according to the present invention will be described below in detail.

Next, a description below will be given on the internal construction of the charging apparatus and the mobile terminal shown in FIGS. 1 and 2.

Figure 3:
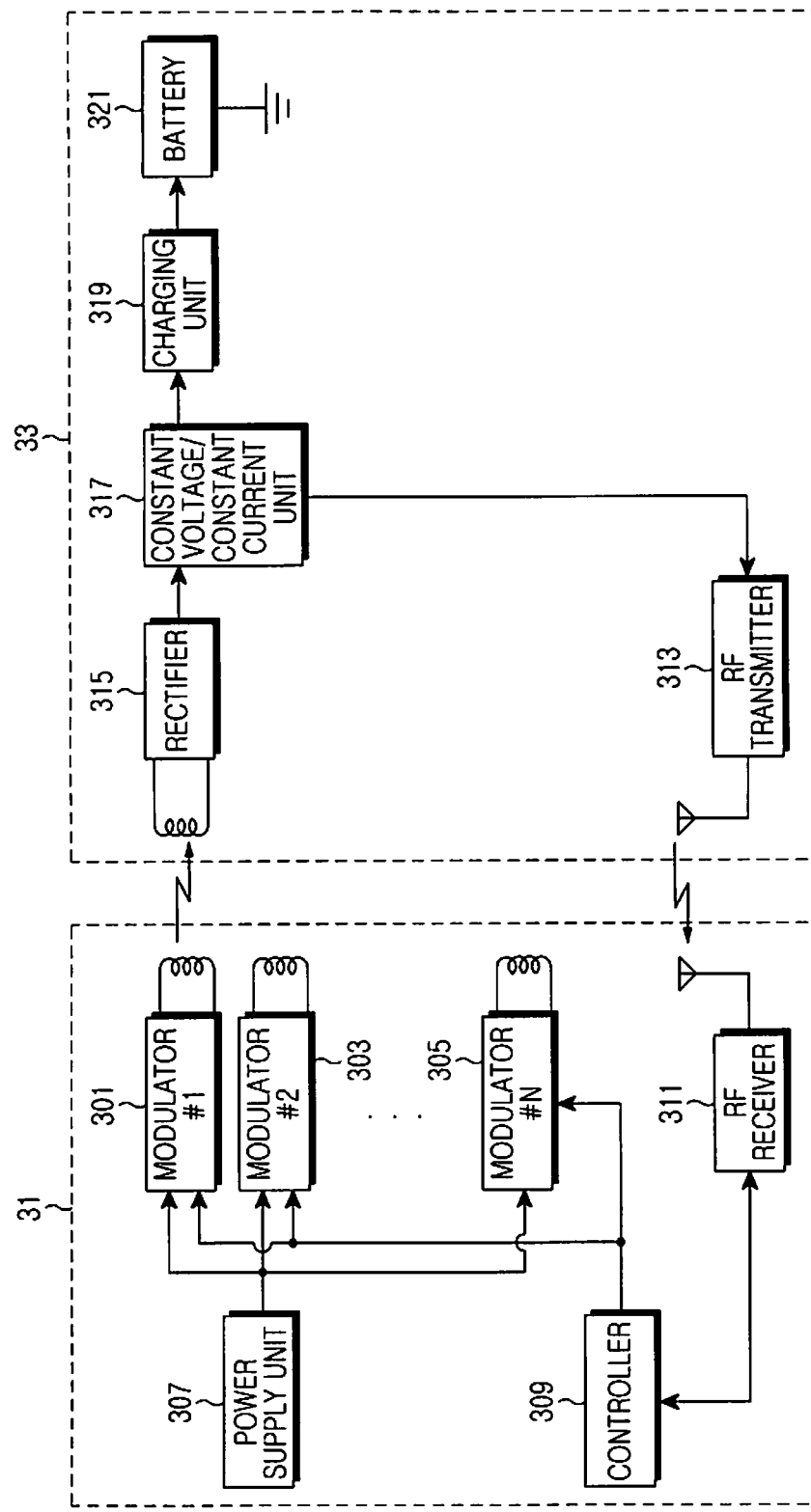
FIG. 3 is a block diagram illustrating the internal construction of a wireless charging system according to an embodiment of the present invention.

FIG. 3 is a block diagram illustrating the internal construction of the wireless charging system according to the embodiment of the present invention. FIG. 3 is described based on an assumption that the wireless charging system includes the charging apparatus 31 and the mobile terminal 33, and the charging apparatus 31 includes multiple first coils.

Referring to FIG. 3, the charging apparatus 31 includes multiple modulators 301, 303, and 305 connected with the multiple first coils, a power supply unit 307, a controller 309, an RF receiver 311.

The power supply unit 307 generates charging power by using an external power source and supplies the generated charging power to the multiple modulators 301, 303, and 305. Typically, the external power supplies alternating current power, so that the power supply unit 307 converts the alternating current power to direct current power and then transfers the converted direct current power to the multiple modulators 301, 303, and 305. The multiple modulators 301, 303, and 305 directly apply direct voltage received from the power supply unit 307 to the multiple first coils or modulate direct voltage to alternating voltage and apply the modulated alternating voltage to the multiple first coils. The first coils connected to the multiple modulators 301, 303, and 305 differently function according to a type of the voltage applied from the multiple modulators 301, 303, and 305.

That is, when direct voltage is applied to a first coil, a static magnetic field is created in the first coil, so that the first coil has the property of an electromagnet and the magnetic substance within the first coil is internally magnetized, to have tensile force. The direct voltage is applied to the second coil of the mobile terminal 33, which is in contact with the charging apparatus 31, according to the strength of the direct voltage. Further, the magnetic substance within the second coil is also internally magnetized, to have tensile force, so that it is possible to arrange the first coil and the second coil. When the alternating voltage is applied to the first coils, the applied alternating voltage is transferred to the second coil.

The RF receiver 311 receives a unique identifier of the mobile terminal 33 to be charged and transfers the received unique identifier to the controller 309. In order to receive the unique identifier of the mobile terminal 33, when the contact of the mobile terminal 33 is detected by a sensor mounted in the charging apparatus 31, the RF receiver 311 transmits a message requesting the unique identifier of the mobile terminal 33 to the mobile terminal 33.

The controller 309 analyzes the unique identifier of the mobile terminal 33 received from the RF receiver 311 and determines if the mobile terminal 33 can receive the power from the charging apparatus 31. Further, the controller controls the multiple modulators 301, 303, and 305 and instructs the multiple modulators 301, 303, and 305 to modulate the voltage according to the present circumstances.

The mobile terminal 33 includes a rectifier 315, a constant voltage/constant current unit 317, a charging unit 319, a battery 312, and an RF transmitter 313, and can additionally include various elements required for communication.

The rectifier 315 converts the alternating voltage received from the charging apparatus 31 through the second coil to the direct voltage. The constant voltage/constant current unit 317 generates the constant voltage and the constant current to charge the battery by using the direct voltage received from the rectifier 315 and transmits the generated constant voltage and constant current to the charging unit 319. When it is necessary to charge the battery 321, the constant voltage/constant current unit 317 supplies the constant current, and when the charging of the battery 321 is completed, the constant voltage/constant current unit 317 supplies the constant voltage. The charging unit 319 supplies the constant voltage and the constant current received from the constant voltage/constant current unit 317 to the battery 321. The RF transmitter 313 transmits the unique identifier of the mobile terminal 33 to the charging apparatus 31.

Figure 4A:
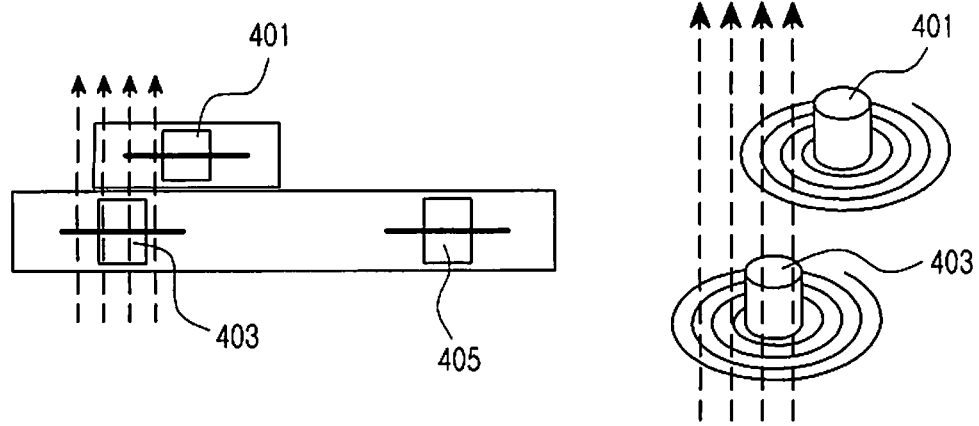
FIGS. 4A and 4B illustrate an arrangement process of a first coil and a second coil according to an embodiment of the present invention.
Figure 4B:
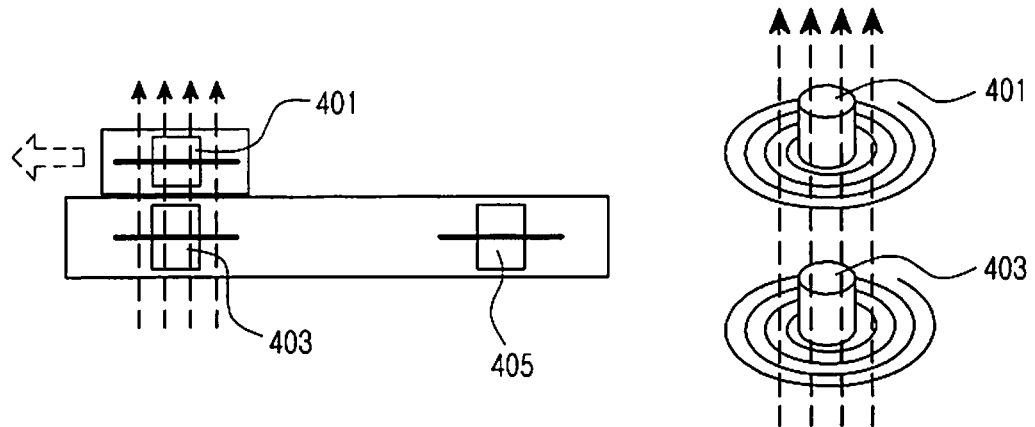

FIGS. 4A and 4B illustrate an arrangement process of the first coil and the second coil according to the embodiment of the present invention. FIG. 4A illustrates a state in which the first coil and the second coil are not aligned, and FIG. 4B illustrates a state in which the direct voltage is applied to the first coil so that the first coil is aligned with the second coil. It is assumed that the charging apparatus shown in FIGS. 4A and 4B includes at least two first coils 403 and 405.

When the mobile terminal is in contact with a certain part of the charging apparatus on an assumption that the charging apparatus shown in FIGS. 4A and 4B include the two first coils 403 and 405, the charging apparatus extracts accurate location information of the mobile terminal by using an internal sensor and identifies an arrangement state of the first coil, which is the closest to the location of the mobile terminal 403, and the second coil 401. When the first coil 403 and the second coil 401 are not appropriately aligned, the charging apparatus applies the direct voltage to the first coil 403 and the applied direct voltage is also applied to the second coil 401 through the first coil 403, although the application of the direct voltage is inefficient.

The magnetic substance within the first coil 403 of FIG. 4B is magnetized through the application of the direct voltage, to have tensile force. This is identically applied to the magnetic substance within the second coil 401. Therefore, both of the magnetic substances within the first coil 403 and the second coil 401 have tensile force, so that the second coil 401 moves toward the fixed first coil 403, to be aligned with the first coil 403, and the application of the direct voltage is efficient.

As shown in FIGS. 4A and 4B, the charging apparatus can include the multiple first coils and the direct current can be applied to all of the first coils. However, this has problems in that power is wasted and the magnetic substances of all of the first coils are magnetized. Therefore, in the present invention, the direct voltage is applied to only the first coil located in the closest location to the mobile terminal sensed by the sensor, so as to arrange the first coil and the second coil.

Figure 5:
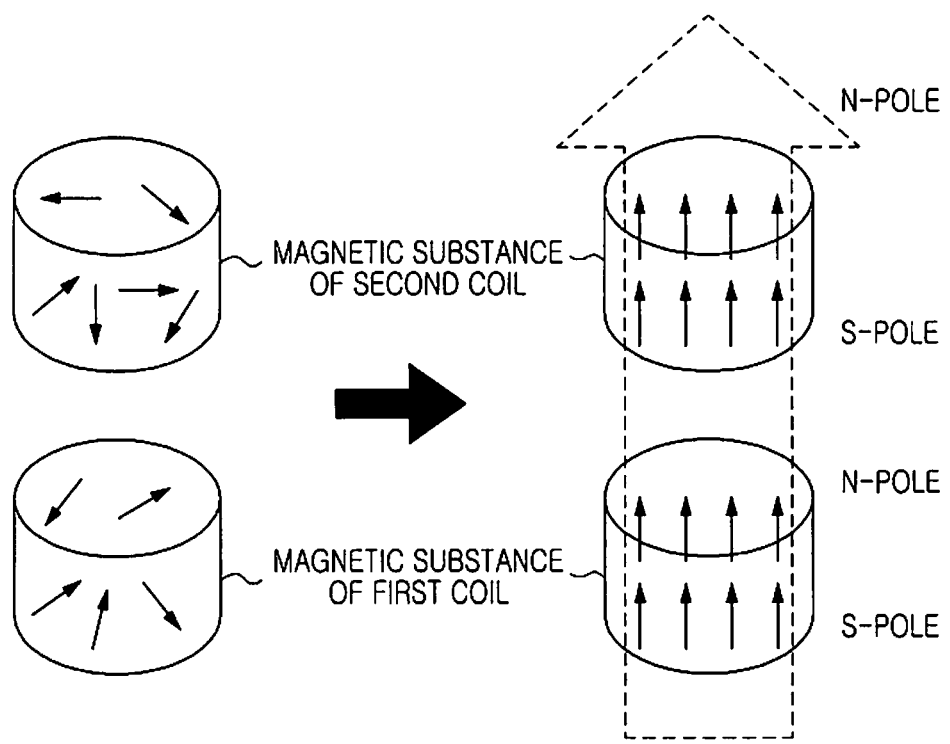
FIG. 5 illustrates a process in which a magnetic substance within a coil is magnetized according to an embodiment of the present invention.

FIG. 5 illustrates a process, in which the magnetic substance within the coil is magnetized according to the embodiment of the present invention.

Referring to FIG. 5, when the direct voltage is not applied to the magnetic substances within the first coil or the second coil, the magnetic substances maintain their non-magnetized states. However, when the direct voltage is applied to the magnetic substances within the first coil or the second coil, the magnetic substance is magnetized, so as to perform a function identical to that of a permanent magnet. At this time, the first coil and the second coil are located within a close distance and the direct voltage flows in one direction, so that the magnetic substances within the first coil or the second coil are magnetized in a same direction and pull each other, thereby being capable of arranging and aligning the first coil and the second coil.

Figure 6:
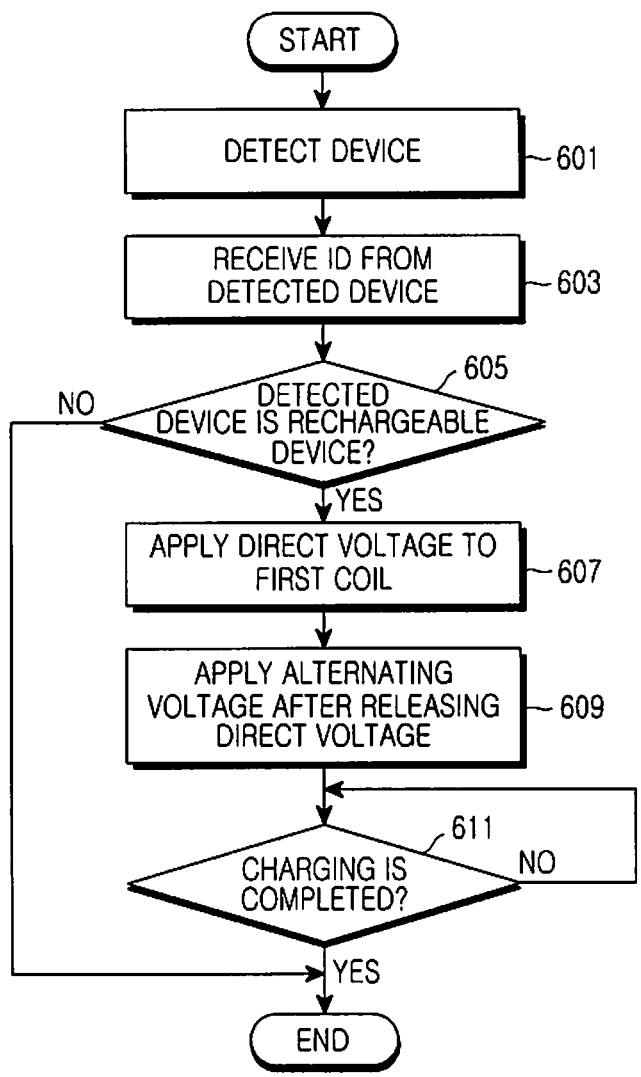
FIG. 6 is a flowchart illustrating a process of a wireless charging through the coil arrangement according to an embodiment of the present invention.

FIG. 6 is a flowchart illustrating a process of a wireless charging through the coil arrangement according to the embodiment of the present invention.

Referring to FIG. 6, the charging apparatus detects a device that is in contact with the charging apparatus in step 601. For example, when the charging apparatus is formed in a pad shape, the mobile terminal can be in contact with an upper side of the pad-type charging apparatus. Then, the charging apparatus determines if the mobile terminal is in contact with the charging apparatus using a sensor mounted in the charging apparatus. If the mobile terminal is in contact with the charging apparatus, the charging apparatus identifies a contact location. As described above, the type and the number of sensors mounted in the charging apparatus can vary.

The charging apparatus receives a unique identifier from the mobile terminal sensed by the sensor in step 603. At this time, the charging apparatus transmits a request message in order to receive the unique identifier of the mobile terminal. Then, the mobile terminal transmits a response message including the unique identifier of the mobile terminal in response to the request message to the charging apparatus. In the present invention, the unique identifier of the mobile terminal can be transmitted/received by using RF communication, and other local area communications can be used therein in addition to RF communication.

The charging apparatus analyzes the received unique identifier of the mobile terminal and determines if the mobile terminal is a rechargeable device in step 605. If the mobile terminal is not a rechargeable device, the charging apparatus is not required to supply the power to the mobile terminal being in contact with the charging apparatus, so that the charging apparatus terminates the wireless charging. If the mobile terminal is a rechargeable device, the charging apparatus applies direct voltage to the first coil included in the charging apparatus in step 607. At this time, if the charging apparatus includes multiple first coils, the charging apparatus applies the direct voltage to the first coil, which is located in the closest location to the detected mobile terminal, and arranges the first coil of the charging apparatus and the second coil of the mobile terminal. Then, the charging apparatus releases the direct voltage that has been applied to the first coil and applies the alternating voltage to the first coil, to transfer the alternating voltage to the second coil in step 609.

The mobile terminal receiving the alternating voltage from the first coil of the charging apparatus rectifies the received alternating voltage, converts the rectified alternating voltage to direct voltage, and starts the charging of the battery in step 611. The mobile terminal supplies constant current to the battery until charging is completed, and when charging is completed, the mobile terminal supplies constant voltage. The full charging of the battery can be identified through an LED lighting, alarm generation, etc.

Through the above process, the most important factor of the arrangement of the first coil and the second coil in the wireless charging can be efficiently performed. The appropriate arrangement of the first coil and the second coil can be identified by a method of, when the mobile terminal converts the received alternating voltage to the direct voltage, measuring the converted direct voltage and comparing the measured direct voltage with a predetermined threshold. When the measured direct voltage is less than the predetermined threshold, the mobile terminal can notify the charging apparatus of the improper arrangement through the RF transmitter and also simultaneously notifies the user of the improper arrangement state. That is, before and after performing the arrangement process, it is possible to identify the arrangement state of the coils using the aforementioned method.

According to FIG. 6, the unique identifier of the mobile terminal is transmitted to the charging apparatus using local area communication, such as RF communication. However, if the coils are arranged without using the separate local area communication, the unique identifier of the mobile terminal can be transmitted to the charging apparatus using another method, other than local area communication. In this case, in order to smoothly transmit/receive the unique identifier, it may be more efficient to first arrange the first coil and the second coil by using the direct current power, and then transmit the unique identifier of the mobile terminal to the charging apparatus.

Accordingly, in order to properly arrange the second coil with respect to the first coil, the present invention applies direct voltage to the first coil, arranges the first coil and the second coil, and then applies the alternating voltage, thereby effectively improving the charging efficiency.

Therefore, through the aforementioned description, it is possible to implement the construction and the operation of the system and the method for efficient wireless charging of the mobile terminal according to the embodiment of the present invention. While the present invention has been shown and described with reference to certain exemplary embodiments and drawings thereof, it will be understood by those skilled in the art that various changes in form and details may be made therein without departing from the spirit and scope of the invention as defined by the appended claims.

What is claimed is:

1. A charging apparatus for efficient wireless charging of a mobile terminal, comprising:
   at least one sensor for detecting the mobile terminal;
   a Radio Frequency (RF) receiver for receiving a unique identifier of the mobile terminal from the mobile terminal and determining if the mobile terminal is a rechargeable device;
   a power supply unit for receiving an alternating voltage from an external power source and transmitting the received alternating voltage;
   at least one modulator for directly applying the alternating voltage received from the power supply unit to a first coil, or converting the alternating voltage received from the power supply unit to a direct voltage and applying the converted direct voltage to the first coil; and
   a controller for controlling whether to convert the alternating voltage received from said at least one modulator.

2. The charging apparatus as claimed in claim 1, wherein when the mobile terminal is in contact with the charging apparatus, said at least one sensor detects a contact location of the mobile terminal.

3. The charging apparatus as claimed in claim 1, wherein the charging apparatus applies the direct voltage to the first coil and aligns a second coil of the mobile terminal, which has been in contact with the charging apparatus, with the first coil.

4. The charging apparatus as claimed in claim 3, wherein the second coil is aligned with the first coil by the direct voltage transferred from the first coil.

5. The charging apparatus as claimed in claim 3, wherein when the direct voltage is applied to the first coil and the second coil, magnetic substances within the first coil and the second coil are magnetized, to have tensile force.

6. The charging apparatus as claimed in claim 1, wherein when the RF receiver receives a message requesting a re-arrangement of the first coil and the second coil from the mobile terminal, the RF receiver transmits a message instructing a re-arrangement of the charging apparatus and the mobile terminal to the controller.

7. The charging apparatus as claimed in claim 6, wherein the mobile terminal converts the alternating voltage received from the first coil to the direct voltage and compares the converted direct voltage with a predetermined threshold, and when the converted direct voltage is less than the predetermined threshold, the mobile terminal transmits the message requesting the re-arrangement of the first coil and the second coil to the charging apparatus.

8. The charging apparatus as claimed in claim 1, wherein the controller identifies the unique identifier of the mobile terminal received from the RF receiver, and when the mobile terminal is not a rechargeable device, the controller does not wirelessly charge the mobile terminal.

9. A method for efficient wireless charging of a mobile terminal, comprising the steps of:
   detecting the mobile terminal by a charging apparatus;
   receiving a unique identifier of the mobile terminal from the mobile terminal and determining if the mobile terminal is a rechargeable device;
   when the mobile terminal is a rechargeable device, applying a direct voltage to a first coil of the charging apparatus and arranging the charging apparatus and the mobile terminal; and
   terminating an application of the direct voltage and then applying an alternating voltage, to supply charging power required for the mobile terminal.

10. The method as claimed in claim 9, wherein in the step of detecting the mobile terminal, when the mobile terminal is in contact with the charging apparatus, the charging apparatus detects a contacted location of the mobile terminal using at least one sensor.

11. The method as claimed in claim 9, wherein when the charging apparatus identifies the received unique identifier of the mobile terminal and determines that the mobile terminal is not a rechargeable device, the charging apparatus does not wirelessly charge the mobile terminal.

12. The method as claimed in claim 9, wherein the charging apparatus applies the direct voltage to the first coil and aligns a second coil of the mobile terminal, which is in contact with the charging apparatus, with the first coil.

13. The method as claimed in claim 12, wherein the second coil is aligned with the first coil by the direct voltage transferred from the first coil.

14. The method as claimed in claim 12, wherein when the direct voltage is applied to the first coil and the second coil, material substances within the first coil and the second coil are magnetized, to have tensile force.

15. The method as claimed in claim 9, further comprising, when a message requesting a re-arrangement of the first coil and the second coil is received, re-arranging the charging apparatus and the mobile terminal.

16. The method as claimed in claim 15, wherein the mobile terminal converts the alternating voltage received from the first coil to the direct voltage and compares the converted direct voltage with a predetermined threshold, and when the converted direct voltage is less than the threshold, the mobile terminal transmits a message requesting a re-arrangement of the first coil and the second coil to the charging apparatus.

17. A method for efficient wireless charging of a portable device, comprising the steps of:
   detecting the portable device by a charging apparatus;
   receiving a unique identifier of the portable device from the portable device and determining if the portable device is a rechargeable device;
   when the portable device is a rechargeable device, applying a direct voltage to a first coil of the charging apparatus and arranging the charging apparatus and the portable device; and
   terminating an application of the direct voltage and then applying an alternating voltage, to supply charging power required for the portable device.

* * * * *